United States Patent [19]

Shannon

[11] 4,337,925

[45] Jul. 6, 1982

[54] HITCH AND SNATCH BOOM ASSEMBLY

[76] Inventor: Jefferson C. Shannon, P.O. Box 808, Yazoo City, Miss. 39194

[21] Appl. No.: 209,486

[22] Filed: Nov. 24, 1980

[51] Int. Cl.³ .......................... B60P 3/28; B66D 3/18

[52] U.S. Cl. .................................. 254/264; 254/8 R; 254/387

[58] Field of Search ............... 212/232, 238, 244, 255, 212/261, 265; 414/563; 254/4 R, 4 B, 8 R, 8 B, 124, 264, 326, 335–337, 387; 280/402

[56] References Cited

U.S. PATENT DOCUMENTS 3,137,401 6/1964 Curtis ................................ 414/563

3,145,857 8/1964 Hayman et al. .................... 414/563

*Primary Examiner*—Robert G. Sheridan

*Attorney, Agent, or Firm*—Cohn, Powell & Hind

[57] ABSTRACT

This hitch and snatch boom assembly includes a ram assembly attached to a transporter vehicle frame at a fixed angle of inclination; an upwardly inclined link member pivotally attached to the transporter vehicle frame and a boom assembly pivotally attached at its inner end to the link, and pivotally attached between its ends to the ram assembly. A cable is attached to the boom assembly at its outer end, and a guide roller assembly, receiving the cable, is mounted to the ram assembly at a relatively low elevation to provide the cable with selected lifting and pulling angles.

9 Claims, 4 Drawing Figures

HITCH AND SNATCH BOOM ASSEMBLY

BACKGROUND OF THE INVENTION

This invention relates generally to hitching and snatching booms and particularly to a compact boom assembly suitable for mounting to a transporter vehicle.

One of the more common methods of hitching and towing is by drum winches. Hydraulic boom hoists and cranes have also been in use for many years. However, the use of drum winches presents considerable problems. For example, cable life is shortened by the necessity of the cable around the drum. It is very difficult to keep the cable properly wound during operation and yet it must be properly and tightly wound on the drum before retracting the load. Damage to the cable, due to improper winding is not infrequent, and may result in slippage and falls. In addition, it is difficult to inspect a drum wound cable for damage.

U.S. Pat. No. 3,145,857 represents the closest known art, U.S. Pat. Nos. 3,362,550 and 3,667,630 are also representative of the art. In the mobile lift crane and vehicle tow hoist disclosed in U.S. Pat. No. 3,145,857 a vehicle frame is provided having a towing hitch at the front end and a fixed braced post at the rear end. An extensible crane boom is pivoted to the post and is provided with a hook at the front end suitable for lifting engine blocks, and the like, from automobiles straddled by the vehicle frame. In order to hoist disabled vehicles, a towing sling is provided which is slidably mounted to the inclined post brace. The sling is vertically adjusted by a cable which passes over an upper pulley mounted at the top of the post and under a lower pulley mounted below a pivotally attached hydraulic ram which raises and lowers the boom. The lifting and towing systems are essentially seaparate, necessitating a double pulley system.

The present device solves the above problems in a manner not disclosed in the known prior art.

SUMMARY OF THE INVENTION

This hitch and snatch boom assembly provides a means of extending and retracting a cable through a set of guide rollers at various lifting and pulling angles and eliminates drum winding problems.

The hitch and snatch boom assembly includes first and second outwardly disposed arm means including upper and lower ends, the lower end of each arm means being attached to a support means, and boom means including inner and outer ends and an intermediate connecting point. The boom means is pivotally connected at its intermediate connection point to the upper end of one of said arm means, and pivotally connected to the upper end of the other of said arm means inwardly of said intermediate connection point. Guide roller means are mounted to one of said first and second arm means or support means and a cable is connected to the boom means outwardly of the intermediate connection point and received by the guide roller means, said cable having a connection means at the remote end having downward and outward movement capability relative to the roller means.

It is one aspect of the invention to provide one of said arm means with a pivotal connection to the support means of its lower end, and to provide the other of the arm means with restraint against pivotal movement at its lower end.

It is another aspect of the invention that the arm means restrained against pivotal movement at its lower end includes a hydraulic ram means providing the extensible arm.

It is a further aspect of the invention to provide the restrained arm means with a housing fixedly attached to the support means and receiving the hydraulic ram means.

In still another aspect of the invention the guide roller means is attached to the housing and includes outwardly extending brackets rotatively mounting a cable-receiving upper roller, and a pair of lower rollers disposed perpendicularly the upper roller and receiving the cable therebetween.

In yet another aspect of the invention the distance between the pivot connection of the arm means to the boom means, is less and the distance between the intermediate pivot connection of the boom means and the connection of the cable to the boom means.

DESCRIPTION OF THE PREFERRED EMBODIMENT

Figures 1, 2:
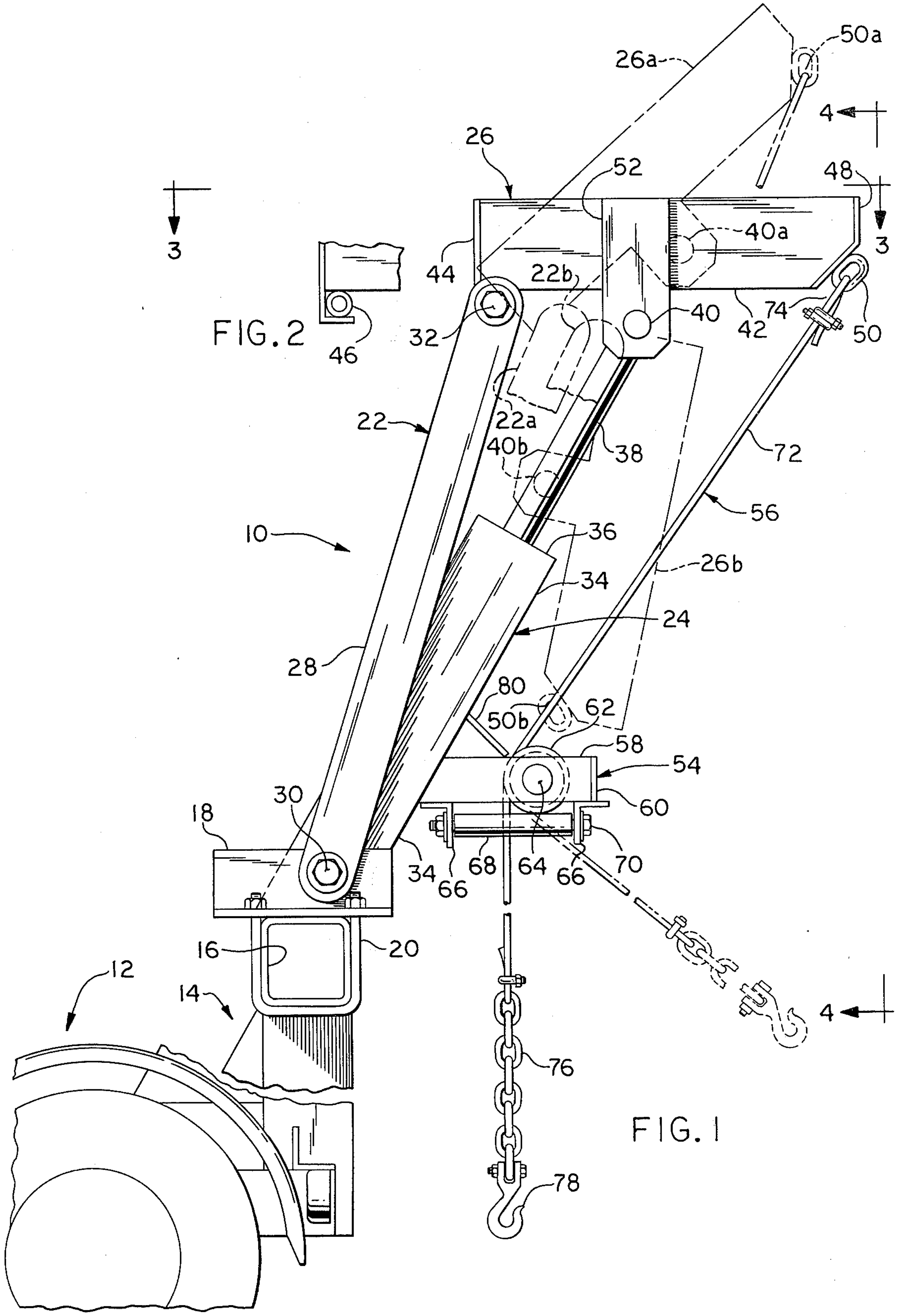
FIG. 1 is an elevational view of the hitch and snatch boom assembly.
FIG. 2 is a fragmentary detail of the pivot connection at the inner end of the boom.
Figure 3:
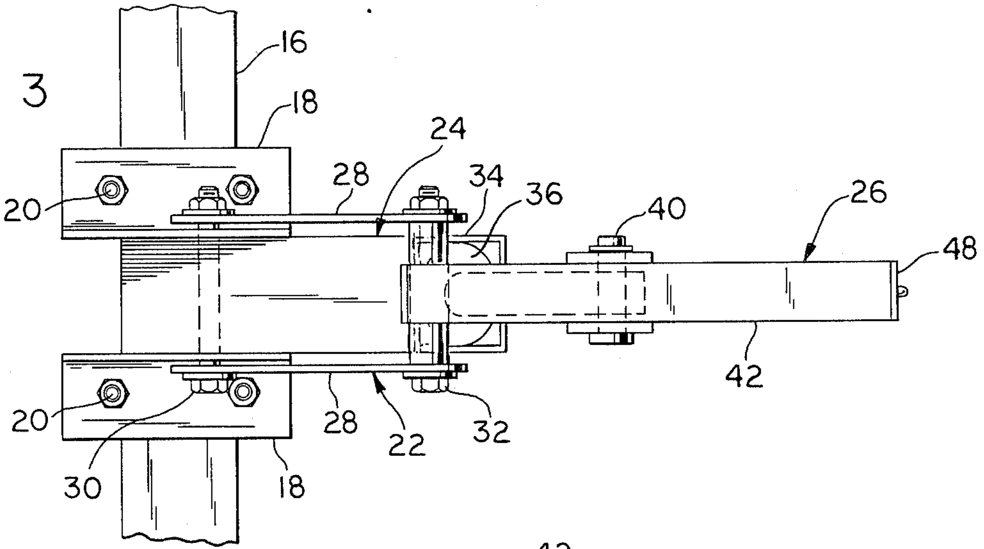
FIG. 3 is a plan view taken on line 3—3 of FIG. 1.
Figure 4:
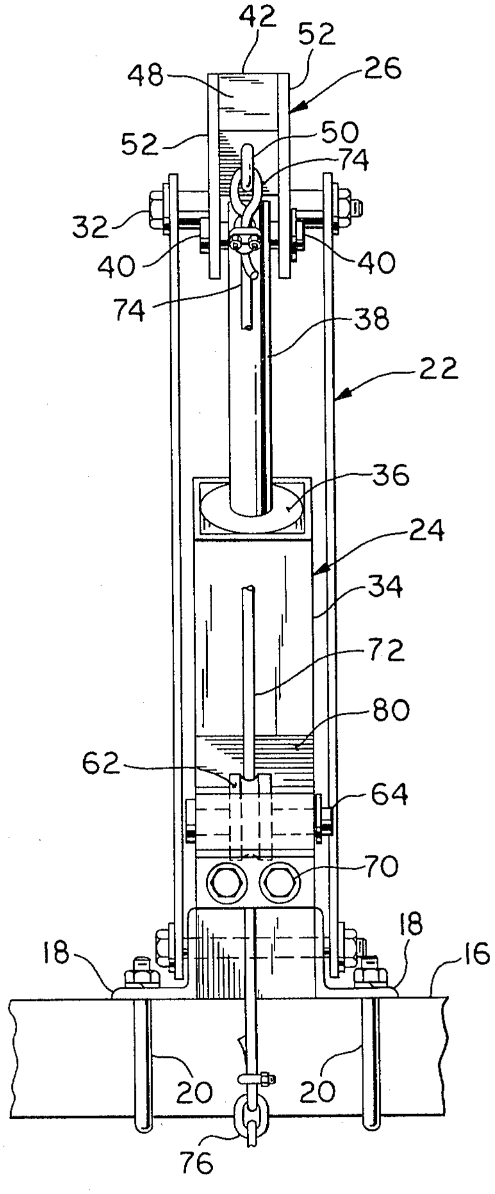
FIG. 4 is a front end view taken on line 4—4 of FIG. 1.

Referring now by reference numerals to the drawings and first to FIG. 1 it will be understood that the hitch and snatch boom assembly generally indicated by numeral 10 is mounted to a transporter vehicle 12. The transporter 12 is provided with a rear frame assembly 14 constituting a support means, said frame including a cross member 16 having a pair of spaced angle members 18 attached thereto as by U-bolts 20. As also shown in FIG. 1, the hitch and snatch boom assembly 10 includes a linkage assembly 22, a ram assembly 24 and a boom assembly 26.

The linkage assembly 22, which constitutes a first arm means, includes a pair of link members 28 pivotally connected to each other and to the support assembly angle members 18 at their lower end by pivot pin 30. The link members 28 are also connected to each other and the inner end of the boom assembly 26 by pivot pin 32.

The ram assembly 24, which constitutes a second arm means, includes a substantially square elongate housing rigidly attached to the angle members 18, as by welding, and a cylinder 36 is received in sliding relation within the housing, said cylinder being provided with a piston 38 attached at its upper remote end to the boom assembly 26 by a pivot pin 40.

The boom assembly 26, which constitutes a boom means, includes a bar member 42 having an inner end plate 44 to which, as shown in FIG. 2, a tubular member 46 is attached, as by welding, to receive the pivot pin 32. The bar member 42 also includes an outer end plate attached to the bar member 42, as by welding, and provided with an eye 50 attached thereto. Intermediate its ends the boom assembly 26 also includes a pair of depending bracket plates 52 attached, as by welding, the the bar member 42 and receiving the pivot member 40.

Importantly, the hitch and snatch boom assembly 10 includes a roller assembly 54 and a cable assembly 56 used in conjunction with said roller assembly. The roller assembly 54, which constitutes a guide roller means, includes a pair of outwardly extending bracket arm 58 welded or otherwise attached to the ram assembly housing 34 and provided with an end plate 60. The bracket arms 58 provide a mounting for a grooved roller 62 which is rotatably mounted to the bracket arms by means of a shaft 64 extending between said arms. A pair of transversely disposed angles 66 are also connected between the brackets 58, as by welding, said angles providing a mounting for a pair of rollers 68 having axes of rotation perpendicular to the axis of rotation of the grooved roller 62, said rollers 62 being rotatably mounted to the angle 66 by means of shafts 70. The cable assembly 56 includes a cable 72 having a loop 74 at its upper end for connection to the boom eye 50 and having a chain lower end portion 76 provided with a hook 78. The cable 72 is received over a relatively small arcuate portion of the upper guide roller 62 disposed between said roller and the ram assembly housing 34. As shown in FIG. 1, the cable 72 is retained in place by means of a retainer plate 80 which is attached, as by welding, to said housing 34 and said cable is received in guided, non-clamped relation between lower guide rollers 68. With this structural arrangement of parts, the connection means provided by the hook 78 at the remote end of the cable 72 is provided with downward and outward movement capability relative to the upper guide roller 62 and the lower guide roller 68 so that the lower portion of the cable 72 may be selectively angled downwardly and outwardly.

It is thought that the structural and functional advantages of this hitch and snatch boom assembly have become fully apparent from the foregoing description of parts, but for completeness of disclosure the operation of the assembly will be briefly described.

The boom assembly 26 is shown in an intermediate horizontal position in FIG. 1. As also clearly shown in FIG. 1, the boom assembly 26 can be raised to the upper position, shown in phantom outline and indicated by numeral 26*a* by extension of the ram piston 38, and said boom assembly can likewise be moved to the lower position, also shown in phantom outline and indicated by numeral 26*b*, by retraction of the piston 38. Because of the pivotal movement of the boom assembly 26 about the pivot pin 32, and the location of the piston pivot pin 40 between the inner and outer ends of the boom assembly, there is a considerable magnification factor in the movement of the pivot pin 40 along the fixed angle straight line path defined by piston movement between the lower and upper positions 40*a* and 40*b* compared to the movement of the cable eye 50 between the upper and lower positions represented by 50*a* and 50*b*. The comparative movement is approximately equal to the proportional relationship between the distance of pivot pin 40 from pivot pin 32, and the distance of the eye 50 from the pivot pin 32. In the preferred embodiment this portion is approximately 2.5 to 1.0, which means that for every foot of movement of the piston 38, the cable hook 78 moves approximately 2.5 feet. Because of this structural relationship of parts, the hitch and snatch boom assembly can be made relatively compact and still achieve a considerably amount of movement of the hook 78. Further, the location of the boom assembly 26 in its lower position as indicated by numeral 26*b*, and the position of the linkage assembly as indicated by numeral 22*b*, relative to the ram assembly 24 provides a compact unit which can be folded out of the way during transport and operated in an area of limited space. This arrangement depends in part on the relative shortness of the boom assembly 26 as compared with linkage assembly 22, and the relatively short distance between the intermediate pivot connection 40 and the eye 50 as compared with the distance from the intermediate pivot connection 40 and the roller assembly 54 when the boom assembly 26 is in the downward position.

The pivoted, hydraulically controlled boom assembly 26 cooperates with the linkage assembly 22 to provide a minimum of cable bend during use and thereby increases the life of the cable 72 and renders it easily replaceable when the boom assembly 26 is in the downward position. In addition, the pivoting nature of the boom assembly 26 provides for natural downward movement of the cable 72 under its own weight through the guide rollers.

In the device as shown, the guide roller assembly 54 is disposed at a point of relatively low elevation near the lower end of the cylinder housing 34, which increases the cable stroke in proportion to the piston stroke through the fixed rollers. Further, the structural arrangement of parts between the boom assembly 26 and the linkage assembly 22, by virtue of the location of the pivot pin 40 between the ends of said assembly, provides a tension balance between the linkage assembly 22 and the cable 72 as said cable moves through the fixed position guide roller assembly 54 during extension and retraction of the ram assembly 24.

The structural arrangement of parts by which the guide roller assembly 54 is mounted on a support means provided by a transporter hitch A-frame results in easy semi-lifting, lowering, pulling or snatching of the hitch of a transported implement (not shown) into alignment with the coresponding transporter hitch for completely connecting the implement and the transporter prior to lifting and pivoting to a transport position.

I claim as my invention:

1. A hitch and snatch boom comprising:

(a) a support means, (b) a first, upwardly disposed arm means including upper and lower ends, the lower end being attached to the support means, (c) a second upwardly disposed arm means including upper and lower ends, the lower end being attached to the support means, (d) one of said arm means being extensible, (e) boom means including inner and outer ends and an intermediate connection point disposed between said ends, said boom means being pivotally connected at its intermediate connection point to the upper end of one of said arm means and pivotally connected to the upper end of the other of said arm means inwardly of said intermediate connection point, (f) guide roller means mounted to one of said means, and (g) a cable connected to the boom means outwardly of the intermediate connection point and received by the roller means, said cable having a connection means at the remote end having downward and outward movement capability relative to the roller means.

2. A hitch and snatch boom as defined in claim 1, in which:

(h) one of said arm means is pivotally connected to the support means at its lower end, and (i) the other of said arm means is restrained against pivotal movement at its lower end.

3. A hitch and snatch boom as defined in claim 1, in which:

(h) one of said arm means is pivotally connected to the support means at its lower end, and (i) the other of said arm means is restrained against pivotal movement at its lower end and includes a hydraulic ram means providing the extensible arm.

4. A hitch and snatch boom as defined in claim 1, in which:

(h) one of said arm means is pivotally connected to the support means at its lower end, and (i) the other of said arm means includes a housing fixedly attached to the support means and a hydraulic ram means received by the housing.

5. A hitch and snatch boom as defined in claim 4, in which:

(j) the roller means is attached to the housing.

6. A hitch and snatch boom as defined in claim 1, in which:

(h) the guide roller means includes outwardly extending brackets having a roller extending therebetween, and a pair of rollers disposed below said roller and having axes of rotation perpendicular to the axis of said one roller and receiving the cable therebetween.

7. A hitch and snatch boom as defined in claim 1, in which:

(h) the distance between the pivot connections of the arm means to the boom means is less than the distance between the intermediate pivot connection of the boom means and the connection of the cable to the boom means.

8. A hitch and snatch boom comprising:

(a) a vehicle including support means at the rear end, (b) an upwardly disposed elongate housing including a lower end fixedly attached to the support means and an open upper end, (c) a hydraulic ram including a cylinder received within the housing and an extensible piston disposed in reciprocating relation to the housing, said piston having a remote end, (d) an elongate upwardly disposed link including a lower end pivotally connected to the support means, (e) a boom including inner and outer ends and an intermediate connection point, said bottom being pivotally connected at its inner end to the upper end of the elongate link and pivotally connected at its intermediate connection point to the remote end of the piston, (f) a guide roller assembly including a bracket fixedly attached to the housing and having a roller mounted thereto, and (g) a cable connected to the outer end of the boom and received by the roller between said roller and said housing, said cable including a remote end having a hook having downward and outward movement capability relative to the roller.

9. A hitch and snatch boom as defined in claim 8, in which:

(h) the guide roller assembly includes a pair of rollers mounted to said bracket below said roller and having axes perpendicular to the axis of said upper roller, said rollers being disposed in spaced relation to each other to receive said cable therebetween.

* * * * *